US006066259A

United States Patent [19]
Viscardi et al.

[11] Patent Number: 6,066,259
[45] Date of Patent: May 23, 2000

[54] METHOD FOR THE DEIONIZATION OF SUBSTANCES THAT ARE NOT STABLE AT ACIDIC PH

[75] Inventors: Carlo Felice Viscardi; Marina Ausonio; Giuseppe Dionisio, all of Milan, Italy

[73] Assignee: Dibra S.p.A., Milan, Italy

[21] Appl. No.: 09/094,510

[22] Filed: Jun. 10, 1998

[30] Foreign Application Priority Data

Jun. 11, 1997 [IT] Italy .................................. MI97A1370

[51] Int. Cl.[7] ...................................................... C02F 1/42
[52] U.S. Cl. ............................................ 210/682; 210/685
[58] Field of Search ................................ 210/685, 682, 210/660

[56] References Cited

U.S. PATENT DOCUMENTS

| | | | |
|---|---|---|---|
| 3,388,059 | 6/1968 | Wirth | 210/685 |
| 3,618,589 | 11/1971 | Tavani | 210/685 |
| 4,131,645 | 12/1978 | Keblys | 210/32 |
| 4,448,693 | 5/1984 | Kiehling | 210/673 |
| 4,481,112 | 11/1984 | Hitzel | 210/620 |
| 5,446,125 | 8/1995 | Honda | 528/486 |
| 5,447,635 | 9/1995 | Viscardi | 210/636 |
| 5,518,627 | 5/1996 | Tomoi | 210/682 |
| 5,811,581 | 9/1998 | Piva | 210/635 |

OTHER PUBLICATIONS

"Ion Exchange Now Purifies Even Saltier Water," Chemical Engineering, p. 76,78, Jun. 1965.

*Primary Examiner*—David A. Simmons
*Assistant Examiner*—Chester T. Barry
*Attorney, Agent, or Firm*—Nixon & Vanderhye

[57] ABSTRACT

A process based on ion exchange with separated beds is disclosed for the deionization of substances that are not stable in the presence of strongly acidic cation exchangers, wherein the solution to be deionized is contacted with a first bed consisting of a basic anion exchanger in the form of hydrogen carbonate and subsequently with a second bed, connected in series, consisting of a weakly acidic cation exchanger in hydrogen form.

10 Claims, 2 Drawing Sheets

METHOD FOR THE DEIONIZATION OF SUBSTANCES THAT ARE NOT STABLE AT ACIDIC PH

BACKGROUND OF THE INVENTION

Many water-soluble non-ionic compounds are produced by synthesis or fermentation along with a certain amount of salt or ionic impurities. One of the conditions necessary to a successful purification is the availability of an efficient tool for the separation of the product from salts or ionic impurities.

In the last two decades, the following technologies have become available to separate non-ionic compounds from salts or ions, which have been produced along the syntheses or during the purification process:

nano- or ultra-filtration (Bungay P. M. et al., "Synthetic Membranes", Science Engineering Application, D. Reidel, C181, 1986; Applegate L. E., "Membrane Separation Process", Chem. Eng., 63–89, 1984);

electro-dialysis (Bungay P. M. et al., "Synthetic Membranes", Science Engineering Application, D. Reidel, C181, 1986);

ion exchange in separate beds or in mixed bed (B. Coulter, Ultrapure Water, November 87, Continuous Deionization, CM, Mag., 19, 29, 1993);

Continuous Deionization (CDI) (Acconazzo, Mauro A., Fluid/Part. Sep. J., 7, 29M, 1994).

The first two methods offer a very practical and economical tool for eliminating large amounts of salts from relatively high molecular weight substances, but are not so suited for reaching a very high reduction ratio in salt concentrations and a very low final salt concentration. In fact, for ultra- and nanofiltration the reduction ratio, which is defined as the ratio between the salt concentration before and after the treatment, depends on diafiltration volume and time by a negative exponential function. From a theoretical point of view, this fact demonstrates that high reduction ratios are very expensive in terms of volumes to be treated and plant dimensions.

In the case of electro-dialysis, reaching very low salinity values is slow and inefficient due to low electrical conductivity of the solution.

Furthermore, neither nano- (or ultra-)filtration nor electro-dialysis are capable of removing relatively large organic ions, which are often present as synthesis by-products, and are often responsible of unwanted discolouring of the product solutions.

For the reasons above explained, final desalting, that is desalting to very low ion concentration, for example below $10^{-4}$, preferably $10^{-5}$ or $10^{-6}$ mol/L, is therefore always performed by ion exchange or by CDI.

A state-of-the-art ion exchange unit for final desalting consists of 2 or 3 columns arranged in series, wherein the first one must contain a strongly acidic cation exchanger in $H^+$ form, optionally together with a weakly acidic cation exchanger; and the second one contains an anion exchanger, which can be either a weakly basic anion exchanger in free base form or a strongly basic one in $OH^-$ form.

The equipment may contain a third column arranged in series, which is again filled with a cation exchanger.

In a device of this type, the strongly acidic cation exchanger contained in the first column is essential to remove neutral salts such as NaCl or $Na_2SO_4$: in fact, these salts are not affected by the treatment with weakly acidic exchangers, since a weakly acidic exchanger can not displace strong acids from their salts, for example HCl from NaCl (it has no salt-splitting capacity).

As a consequence, a conventional separate beds-ion exchange unit can not deionize compounds that are not stable when in contact with the strongly acidic ion exchanger itself.

Mixed-bed units can not solve the problem, as weakly acidic cation exchangers are not applicable to mixed beds. In fact, the separation between anion and cation exchangers, which is necessary to regenerate the mixed bed, can be performed only if there is a high difference in the densities of the anion and cation exchangers, while weakly acidic cation exchanger have densities which are very near to the anion exchangers' ones.

Finally, also CDI is based on a mixed bed in which cationic component is strongly acidic.

In conclusion, in the state of the art, all the technologies available for final desalting, that is all the technologies that allow to reduce neutral salt concentration to below $10^{-4}$ mol/L or to reduce neutral salt concentration of a factor grater than 100, involve the use of strongly acidic cation exchanger. As a consequence, final desalting of compounds that are not stable in contact with the strongly acidic sites of the exchanger or that can be protonated and fixed by the strongly acidic sites of the exchanger is difficult and gives normally poor results in terms of residual salts content and yield.

Another difficult case to treat with presently available desalting technologies is the one in which the product itself is stable to the contact with the strongly acidic cation exchanger, but some of the impurities react with the strongly acidic cation exchanger to give other impurities, which can no more be eliminated from the ion exchangers. In this case, the lack of a final desalting technology that does not require the contact of the solution to be desalted with a strongly acidic cation exchanger makes the removal of these reacting impurities difficult, if not impossible.

DESCRIPTION OF THE INVENTION

The object of the present invention is a separate bed-ion exchange process which is capable of reducing salt concentration in the treated solution to a concentration below $10^{-4}$ and of a factor grater than 100 without contacting the solution with a strongly acidic cation exchanger in $H^+$ form.

The process of the present invention thus provides for the first time a tool for efficiently desalting substances that are not stable to the contact of the strongly acidic cation exchangers.

Furthermore, as the use of a strongly basic anion exchanger in $OH^-$ form is not essential to the process of the present invention, this process also provides for the first time a tool for desalting solution of substances that are simultaneously incompatible both with strongly acidic cation exchangers in $H^+$ form and with strongly basic anion exchangers in $OH^-$ form.

In the process according to the present invention, the solution to be desalted is contacted with two separate beds of ion exchangers connected in series: the first bed consists of a strongly basic anion exchanger in $HCO_3^-$ form and the second bed consists of a weakly acidic cation exchanger in $H^+$ form.

The first bed substitutes most of the anions present in the solution to be treated with $HCO_3^-$ and the second one substitutes most of the cations with $H^+$ ions, thus displacing the weak and volatile carbonic acid from its salts.

The net result of the process is a substantial desalting of the solution and the evolution of $CO_2$ from the second bed.

According to another aspect of the present invention, the solution to be desalted may be contacted with a third small size bed, connected in series after the second one, containing an anion exchanger either of weakly basic or of strongly basic type in $OH^-$ form. This additional column reduces the residual concentration of ions in the treated solution.

Finally, the solution to be desalted may be contacted in series with a fourth small size bed, containing a weakly acidic cation exchanger in $H^+$ form, to obtain a further reduction of the residual concentration of ions in the treated solution.

Strongly basic anion exchangers are normally available on the market in $Cl^-$ form. The $HCO_3^-$ form can be easily obtained from the $Cl^-$ form by ion exchange with a solution of low-cost commercial hydrogen carbonate, such as $NaHCO_3$ or $NH_4HCO_3$. The same hydrogen carbonate solution can be used to regenerate the spent exchanger bed after its use for desalting the process solution.

If the regeneration is accomplished with ammonium bicarbonate, it can be almost entirely recovered from the spent regenerant solution by distillation, thus cutting the operating cost of the first bed.

Weakly acidic cation exchangers are normally sold in $H^+$ form, therefore they need no regeneration before use. The spent exchanger can be easily regenerated with HCl or $H_2SO_4$ in little excess with respect to the stoichiometric amount, as indicated by the technical data sheets of the suppliers.

Once the ion exchangers have been brought in the required ionic form, they are rinsed to eliminate regenerant residues and then used for desalting the process solution.

The process solution to be desalted is fed into the first column, containing the strongly basic anion exchanger in $HCO_3^-$ form; the eluate from the first column is fed into the second column, which contains the weakly acidic cation exchanger in $H^+$ form, then the eluate can be optionally fed into a third column containing an anionic exchanger either of weakly basic or of strongly basic type in free base or $OH^-$ form.

This additional column reduces the residual concentration of ions in the treated solution. Finally, the eluate from the third column may be fed into a fourth small size column, containing a weakly acidic cation exchanger in $H^+$ form, to obtain a further reduction of the residual concentration of ions in the treated solution.

The two, three or four columns used to desalt the process solution are then rinsed with water to displace the desalted product from the ion exchangers: the eluate obtained during this rinsing step is then normally collected together with the desalted product solution.

The strongly basic anion exchanger can be selected from any commercially available type I (namely with trimethylammonium functional groups) or type II (namely with dimethyl-2-hydroxyethylammonium functional groups), gel or macroporous type, for example R&H Amberjet 4200 or 4400 or IRA 900, Diaion Relite 3A or 3AS, Dow Chemical Monosphere AI500 or AII500.

When available, small particle size grades are preferred, as they allow a faster exchange: for example, "fb" grade is the preferred grade for Diaion 3A or 3AS.

The weakly acidic cation exchanger can be selected from any commercially available type, normally containing carboxylic acid functional groups: the products based on gel matrix are preferred with respect to the ones having macroporous matrix. For example R&H IRC86, Diaion Relite CC and Dow Chemical Dowex CCR3 can be cited.

When available, small particle size grades are preferred, as they allow a faster exchange: for example, "lb" grade is the preferred grade for Dow Chemical Dowex CCR3.

An apparatus for performing the desalting process above disclosed is another object of the present invention.

The device according to the present invention shall be illustrated in detail also by means of figures, wherein.

The apparatus necessary for carrying out the process of the present invention consists of two column in series. According to FIG. 1 the first column (C-1), which contains the strongly basic anion exchanger in $HCO_3^-$ form, may be constructed as a standard downward-flow ion exchanger column, equipped with distributor and support plate.

The inlet can be connected to the $HCO_3^-$ solution feed tank, to deionized water for the rinsing operations and to the tank containing the solution to be treated; the liquid outlet below the support plate can be connected to sewage for eliminating exhaust rinsing solutions, to the inlet of the second column and optionally to $HCO_3^-$ recovery system, if present.

The column can be designed to be pressurised with nitrogen or air, if required by static head over the outlet or by pressure drops in the column itself or in the lines.

Figure 1:
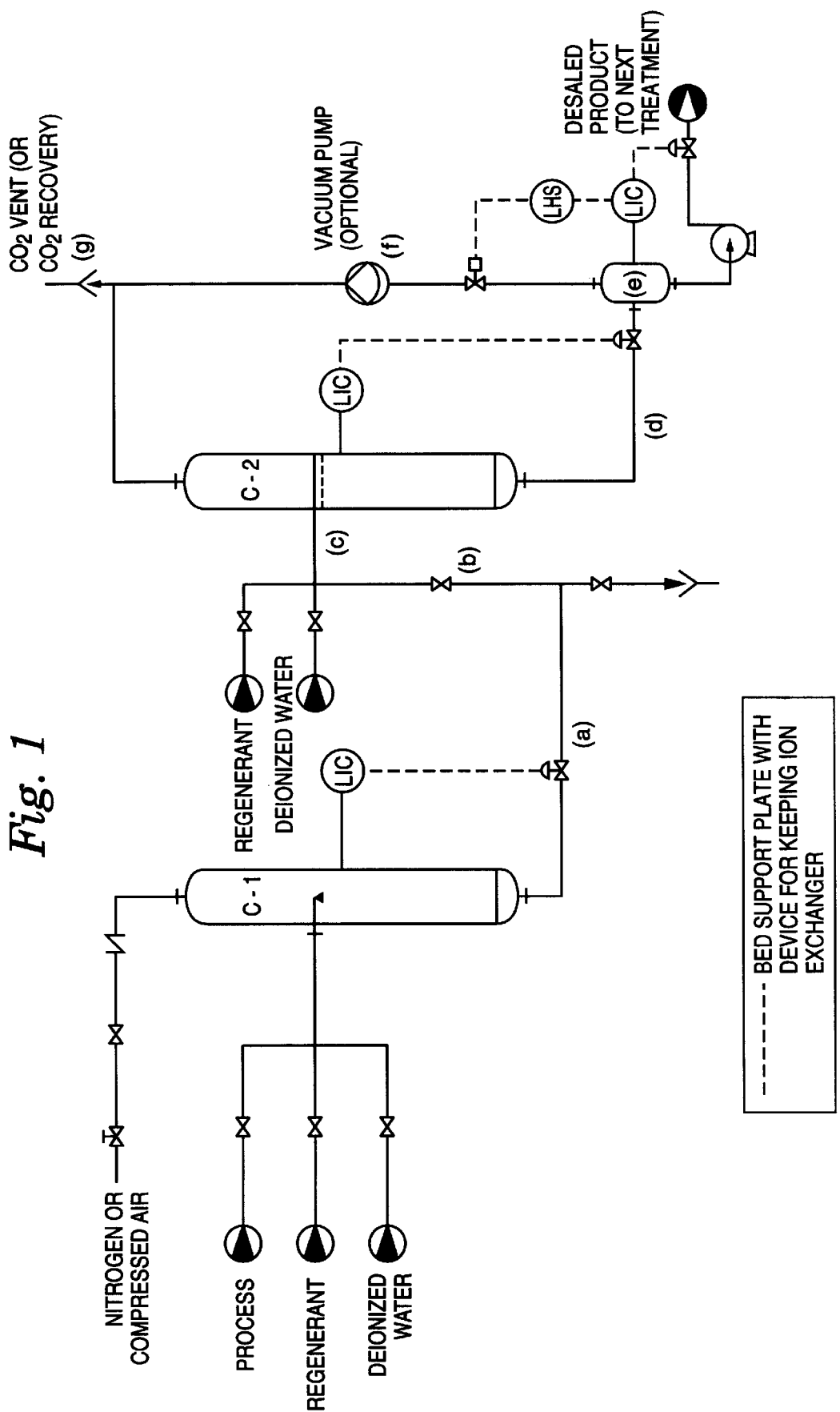
FIG. 1 shows a first embodiment of the apparatus according to the present invention.

The second column (C-2) can be constructed as a standard ion exchange column, equipped for downward-flow operation, as shown by the path (a), (b), (c), (d) in FIG. 1. The second column is characterised in that it is equipped with a vent for the $CO_2$ developed during the process, and in that the liquid outlet at the bottom of the column is connected to a gas-liquid separation vessel (e), which can be either at atmospheric pressure or kept at reduced pressure (for example by a vacuum pump (f), as in FIG. 1) in order to eliminate $CO_2$, which evolves as a gas.

In a variation of the present invention, the gas-liquid separator can be substituted with a nitrogen or air or steam stripper to improve the dissolved $CO_2$ elimination.

Figure 2:
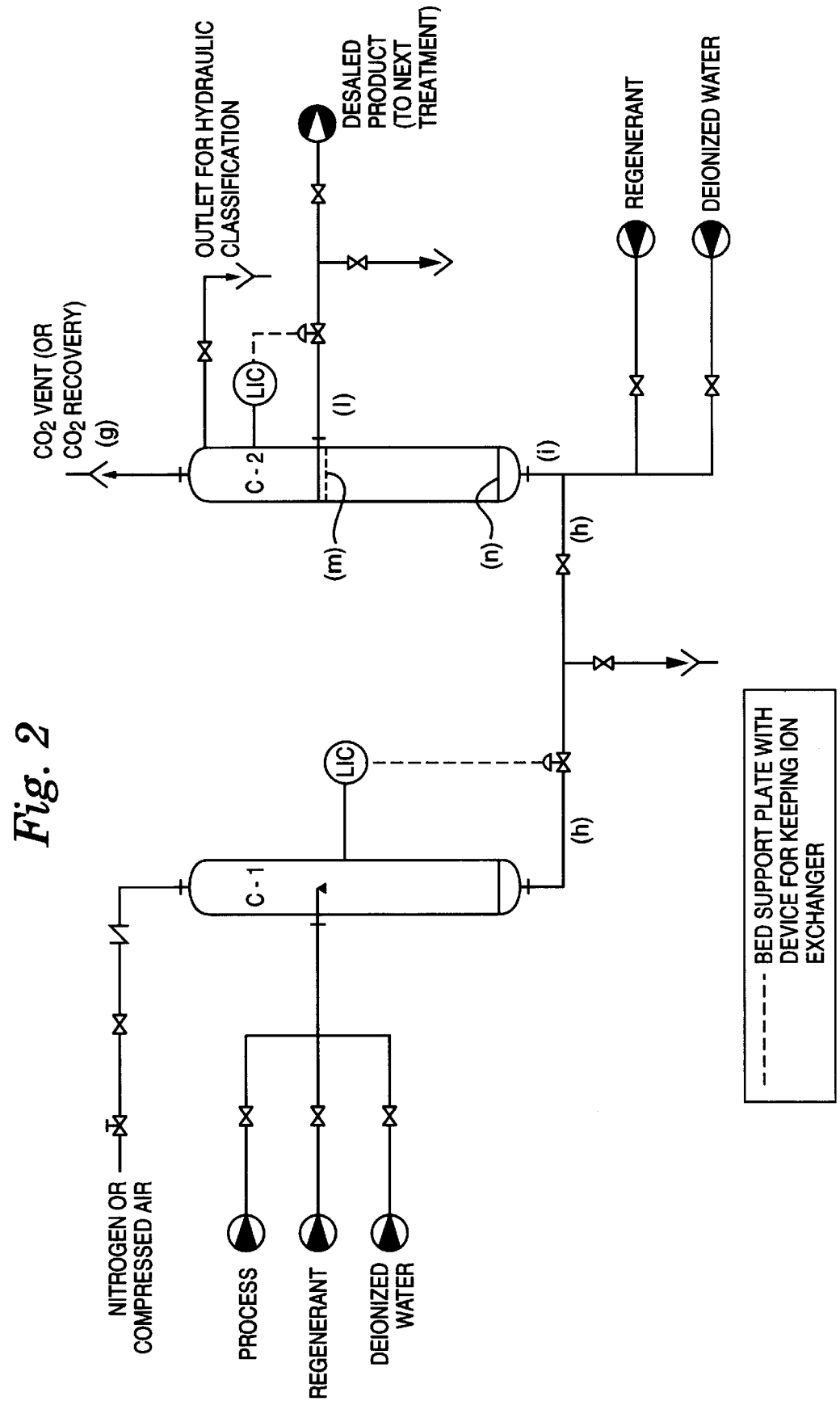
FIG. 2 shows a second embodiment of the apparatus according to the present invention.

In a second embodiment of the apparatus according to the present invention, as shown in FIG. 2, the second column (C-2) is equipped to operate with an upward flow, as shown by the path (h), (i), (l). In this case, the column has two support plates, the first (n) support plate (which is present also in the first embodiment) stands below the resin, the second (m) support plate stands above the resin.

The column can be designed to be pressurised with nitrogen or air, if required by static head over the outlet or by pressure drops in the column itself or in the lines; in this case a pressure regulator must be provided in order to control the vent valve, so as to avoid that the pressure in the column rises above the determined value, due to $CO_2$ evolution.

The third and forth column, if present, can be built as standard state-of-the-art ion exchanger columns, equipped for downward flow operation.

The process, object of the present invention, is very useful in a number of technical fields, particularly in pharmaceuticals and in the production of fine chemicals, wherein the need to have available very efficient purification methods is still strongly felt.

Among the pharmaceuticals on which it is possible to apply the process of the present invention, by using the apparatus above disclosed, in particular non-ionic compounds, such as, for example, iodinated contrast agents for radiographic techniques or paramagnetic contrast agents for magnetic resonance tomography are to be cited. Said products must be administered in particularly high concentrations. Preferred examples are Iomeprol, Gadoteritol and Gadobuterol.

The following examples are offered with the purpose of illustrating the best experimental conditions to carry out the process of the present invention.

EXPERIMENTAL PART

Example 1

Desalting of a solution containing a compound which is dissociated by the strongly acidic exchanger (Gadoteritol or gadolinium complex of 10-(2-hydroxypropyl)-1, 4,7,10-tetraazacyclododecane-1,4,7-triacetic acid of formula (VII))

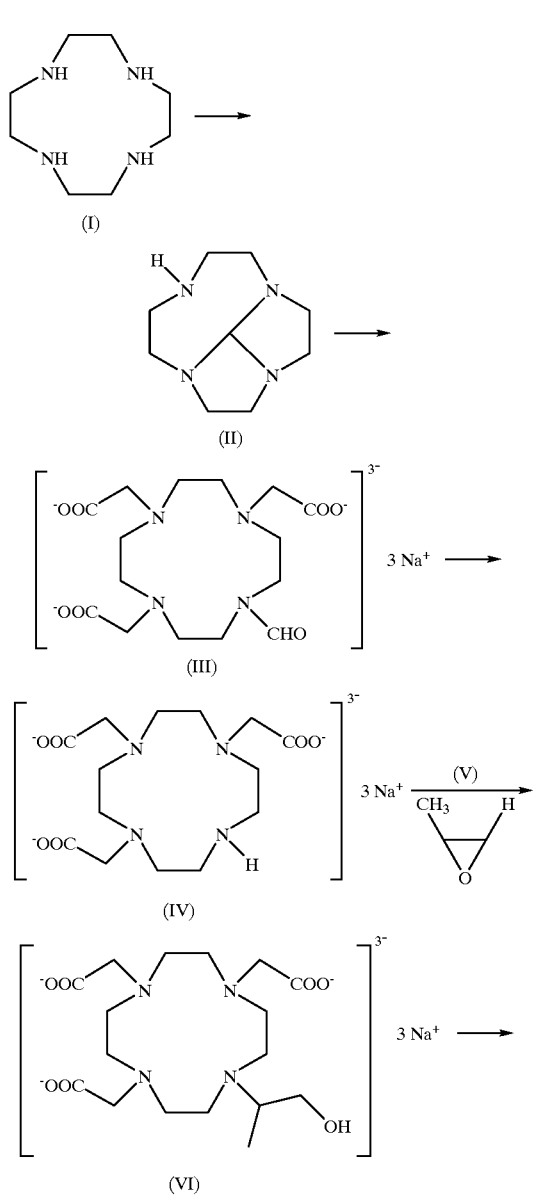

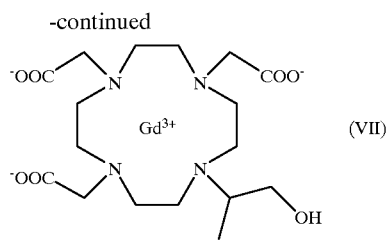

A. Preparation of 5H,9bH,2a,4a,7-octahydrotetraazacyclododecane [cd]pentalene of formula (II)

23.8 kg (0.138 kmoles) of 1,4,7,10-tetraazacyclododecane, containing 0.7% w/w of water were dissolved into 23.8 kg of amyl alcohol. Water-amyl alcohol azeotropic mixture and amyl alcohol excess were distilled at reduced pressure in the order. Subsequently, in nitrogen atmosphere, 24.5 kg (0.166 kmoles) of triethyl orthoformate and 355 g of propionic acid were added. The reaction mixture was heated at 125° C. for 11 hours, while distilling evolved ethanol, then the reaction mass was cooled down to 35° C., obtaining the desired compound in the form of fluid oil.

B. Preparation of the Sodium Salt of 10-formyl-1, 4,7,10-tetraazacyclododecane-1,4,7-triacetic Acid of Formula (III)

The compound obtained in A. above was added to a solution prepared by dissolving 81.5 kg (0.469 kmoles) of bromoacetic acid and about 62.6 kg of NaOH 30% w/w in 100 kg water, to pH 5. During the addition of the crude compound, pH was kept at 11, by adding NaOH. When the addition finished, pH was adjusted to 11.1, again with NaOH 30% w/w and the reaction was left to stand for 24 hours at 35° C.

C. Preparation of the Sodium Salt of 1,4,7,10-tetraazacyclododecane-1, 4,7-triacetic Acid of Formula (IV)

77.3 kg of NaOH 30% w/w were added and the mixture warmed at 70° C. for 9 hours. An aqueous solution containing 0.131 kmoles of the desired compound (as determined by HPLC), in the form of trisodium salt, were obtained.

D. Synthesis of Gadoteritol of Formula (VII)

pH was adjusted to 12.3 with conc. HCl and 15.2 kg (0.262 kmoles) of propylene oxide of formula (V) were added. After reacting for 4 hours at 40° C., the solution was warmed up to 50° C., then 120 kg of an aqueous solution containing 0.135 kmoles of gadolinium trichloride were added. After 1 hour, the mixture was cooled down to 17° C. and pH was adjusted to 1.7 with conc. HCl and this pH was kept for 2 hours. The solution was then warmed to 50° C., pH was adjusted to 7 with NaOH and the mixture was kept in these conditions for 1 hour.

E. Raw Gadoteridol Prepurification

The raw solution of Gadoteritol, obtained above (D.) was cooled and transferred through an in-line filter and a column filled with 150 L R&H Amberlite XAD1600 to a nanofiltration unit equipped with Desal DK4040F elements. When the reactor was empty, the reactor, the in-line filter and the column were rinsed 3 times with 300 L deionized water. The resulting rinsing solution was collected in the nanofiltration unit, together with the product solution. The nanofiltration unit was operated at 32 bar and 25° C. to concentrate and partially desalt raw gadoteridol solution.

At the end of the operation, 250 L raw Gadoteritol solution, having a conductivity of 2.9 mS/cm were obtained.

F. Final Desalting

Gadoteridol solution was then fed at 200 L/h to a series of four ion-exchanger beds, the first bed (C1) consisting of 120 L strongly basic anion exchanger Diaion Relite 3ASfb in $HCO_3^-$ form, the second bed (C2) of 100 L weakly acidic cation exchanger Relite CC in $H^+$ form, the third bed (C3) of 20 L Relite 3ASfb in $OH^-$ form and the fourth bed (C4) of 20 L Relite CC in $H^+$ form.

All columns were vented to atmosphere; the liquid outlet at the bottom of the second column was equipped with a 3 L flash vessel (separation vessel) connected to a vacuum system to eliminate $CO_2$.

The outlet of the fourth column was equipped with a density detector to detect the product in the eluate. The first 180 L eluate were discarded; eluate was then collected in a product-rich fraction.

When all raw Gadoteridol solution had been loaded onto the ion exchange unit, the product was eluted with 600 L deionized water, and the eluate was collected together with the product-rich fraction. The product-rich fraction was colour-free and practically free from salt impurities (conductivity 2.2 $\mu$S/cm).

The yield of the final deionization was 98%, based on the HPLC assay.

G. Isolation of the Product (Gadoteridol)

The product-rich fraction was thermally concentrated to viscous residue, the residue was added with 350 kg isopropanol at 79° C.

The resulting slurry was kept at reflux temperature for 1 h, cooled and centrifuged. After drying at reduced pressure, 68.2 kg (0.111 kmoles) Gadoteridol, containing 10% hydration water, were obtained; HPLC assay: 98.5% (s.a.).

Overall yield: 80.7%

IR and MS spectra were in accordance with the expected structure.

Example 2

Desalting of the same solution of example 1 in a conventional separate bed unit

The process described in example 1 was repeated up to the end of step E.: the solution was then percolated onto a traditional three-beds ion exchange unit, the first bed consisting of 120 L-strongly acidic cation exchanger in $H^+$ form, the second bed consisting of 120 L weakly basic anion exchanger in free base form and a third bed consisting of 20 L strongly acidic cation exchanger in $H^+$ form. The outlet of the third bed was equipped with a density transmitter, in order to detect the product in the eluate. During the percolation of the product solution onto the ion exchangers, it was observed that the eluate density at the outlet of the third column increased much later and slower than in example 1, although the physical volume of the beds was almost the same of example 1; moreover, when density began to increase, also conductivity began to increase, showing that the salt removal capacity of the ion exchanger had been saturated.

After all raw Gadoteridol solution had been charged onto the ion exchange unit, the product was eluted with 600 L deionized water to displace the product and the eluate was collected together with the product-rich fraction. The product-rich fraction was evidently orange-yellow discoloured; its conductivity was 0.9 mS/cm.

The final deionization yield, based on the HPLC assay, was very low (72%). Low yield and bad desalting performances of the ion-exchange unit of this example were both explained by the dissociation of Gadoteridol in free ligand (HPDO3A) and free gadolinium on the strongly acidic cation exchanger in $H^+$ form: both free gadolinium and free ligand (HPDO3A) were fixed by the cation exchanger itself until they saturated the exchanger: at this point gadoteridol and salts began to pass together through the cation exchange unit.

To support this explanation, the cation exchanger was regenerated with 20% w/w hydrochloric acid, the eluate was collected and evaporated to dryness.

The dry residue consisted mainly in gadolinium trichloride and HPDO3A hydrochloride.

Example 3

Desalting of the same solution of Example 1 in a conventional mixed bed unit.

We repeated the process described in example 1 up to the end of point E.

The solution was then treated in a conventional mixed bed unit, consisting of 140 L strongly acidic cation exchanger R&H Amberjet 1500 in $H^+$ form and 140 L strongly basic anion exchanger, R&H Amberjet 4200 in $OH^-$ form.

At the end of percolation of raw gadoteridol solution, the mixed bed was eluted with 600 L water to displace gadoteridol; the eluate collected in this phase was mixed with the product-rich fraction.

The product-rich fraction was pale yellow; its conductivity was 200 $\mu$S/cm. The yield, 80% based on the HPLC assay, of the final deionization was better than the yield of the 3 separate bed case of example 2, but still far lower than the value obtained with the process of the present invention.

Mixed bed performs better than separate beds because it does not lower pH of the solution during percolation, so that the product does not dissociate in the bulk of the solution in the column, but the contact with the strongly acidic resin sites was still sufficient to dissociate part of the product, thus causing both loss of product and reduction of desalting capacity.

Example 4

Regeneration of the ion exchangers used for the experiment in Example 1 and subsequent use of the regenerated exchangers We regenerated the cation exchanger beds C2 and C4 used in Example 1 with respectively 70 kg HCl 34% w/w diluted with 250 kg water and with 16 kg HCl 34% w/w diluted with 55 kg deionized water. C1 was regenerated with a solution obtained by dissolving 60 kg $NaHCO_3$ in 760 kg water and C3 was regenerated with 17 kg 30% w/w NaOH diluted to 130 kg with water.

After regeneration, we rinsed separately each column with 3 bed volumes deionized water, we connected the columns in series and repeated the procedure of the example 1.

We obtained the same results in terms of purity and a slight increase in overall yield (80.7%).

We performed then a third regeneration-use cycle with the same procedure and obtained the same results in terms of purity and overall yield (80.1%).

Example 5

Desalting and purification of a compound containing a ionic impurity which reacts at acidic pH values to give a non-ionic impurity.

The obtained solution weighed 400 kg and contained about 40% w/w of the product, about 0.05 mol/kg of inorganic ionic impurities and 0.07 mol/kg of organic ionic impurities.

These latter included 2-[[3,5-diiodo-2,4-bis(2,3-dihydroxypropyl)-6-(methylamino)]phenoxy]acetic acid, of formula (IX), which at a pH lower than 3 or in contact with the acidic sites of a strongly acid cation exchanger is quickly converted into the lactamic structure N,N'-bis(2,3-

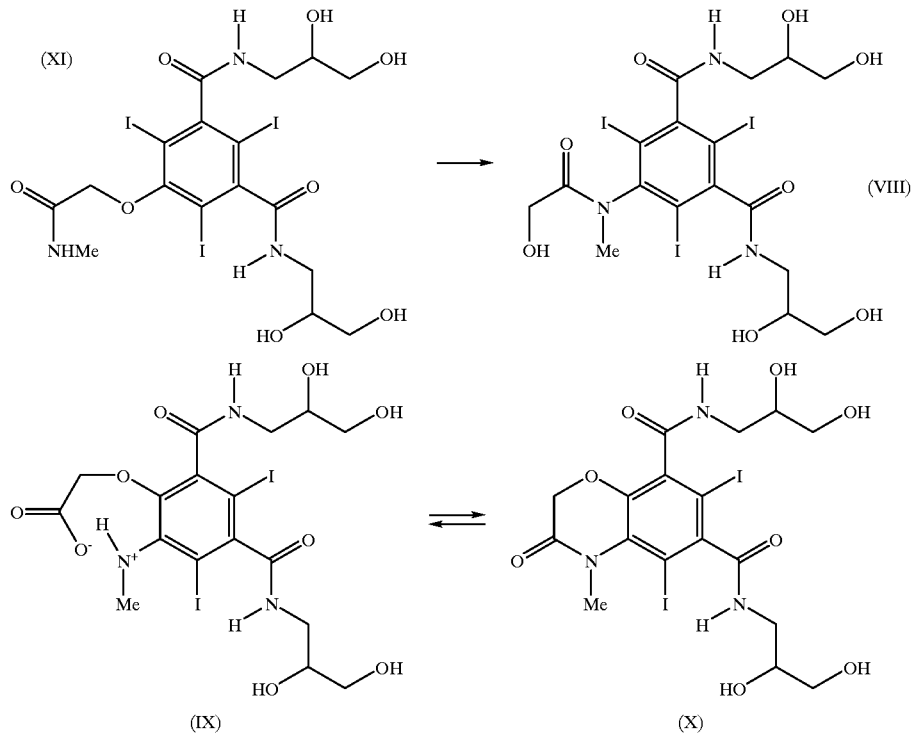

A. Solution of N,N'-bis(2,3-dihydroxypropyl)-5-[(hydroxyacetyl) methylamino]-2,4,6-triiodo-1,3-benzenedicarboxamide, [Iomeprol, of formula (VIII)]

180 kg of the compound of formula (XI), obtained according to the procedure described in EP 0185130, were suspended into 800 kg water and heated to reflux. To the suspension 620 kg 30% w/w sodium hydroxide were added.

The mixture was heated to 120° C., letting the reactor pressurise, and this temperature was kept for 1 hour. Temperature was then lowered to 50° C. and 15.4 kg 30% w/w sodium hydroxide were added; afterwards, temperature was gradually lowered to 40° C. in 2 hours.

After 4 hours at 40° C., the mixture was cooled to 20° C. and pH adjusted at 5.5 with hydrochloric acid. The obtained solution was loaded onto 320 L absorbing resin R&H Amberlite 1600, feeding the eluate to a nanofiltration unit equipped with Desal DK 4040 membranes.

At the end of loading operation, 1600 kg water at 40° C. were used for elution, while collecting eluate in the nanofiltration unit tank.

During elution, or at its end, nanofiltration unit was operated, going on until the solution volume in the unit itself was reduced at about 400 L.

Most of sodium chloride contained in the eluted solution was eliminated at the same time of the concentration.

dihydroxypropyl)-3,4-dihydro-5,7-diiodo-4-methyl-3-oxo-2H-1, 4,-benzooxazine-6,8-dicarboxamide of formula (X).

B. Final Desalting

The solution obtained in point A. was fed at 200 L/h to the ion-exchange unit described in example 1, point F.

After all the solution had been loaded on the ion exchange unit, the unit was fed with 600 L water to eluate the product: the eluate was collected together with the product-rich fraction. This fraction was colourless and had a conductivity of 5.3 $\mu$S/cm; was free of organic ionic impurities, the compound of formula (IX) included, and did not contain the compound of formula (X).

The final deionization yield was 98% (HPLC determination).

The product-rich fraction was then thermally concentrated to a viscous residue, 880 kg absolute ethanol were added to the residue, while keeping the solution at reflux. A suspension was obtained at the end of addition, which was kept at reflux for 16 hours, cooled down to 25° C. and centrifuged.

After drying at reduced pressure, 138 kg dry Iomeprol were obtained (HPLC assay 99.8%; overall yield 76.7%).

The product was highly pure: it did not contain detectable amounts neither of ionic impurities, nor of compound (X); the 54% w/w solution was colourless and showed only a very low light absorption between 420 and 450 nm, while no absorption was observed between 450 and 650 nm.

Example 6

Desalting and purification of the same compound of example 4 in a conventional separate beds unit A solution obtained according to the same process described in Example 5, step A, with the same impurity content, was fed at 200 L/h into a conventional three beds-unit described in Example 2.

When all the raw Iomeprol solution was loaded on the ion exchange unit, the unit was washed with 600 L deionized water to eluate the product: the collected eluate was mixed with the product-rich fraction.

The product-rich fraction was slightly yellow-green coloured, had a conductivity of 15.2 μS/cm and was substantially free from organic ionic impurities, compound of formula (IX) included, but, contrary to the solution obtained in Example 5, it contained the compound of formula (X) in an amount corresponding to the content of compound of formula (IX) of the raw Iomeprol solution before the ion exchange treatment.

This result is explained by the complete conversion of the compound of formula (IX) into the lactamic structure of the compound of formula (X) at the low pH values reached in the strongly acidic cation exchanger bed; the non ionic lactamic structure of formula (X) can not be removed by the subsequent anion and cation exchanger beds, thus remaining in the treated solution.

Desalting yield was equivalent to the one of Example 5. Product-rich fraction was then treated according to the same procedure described in Example 5.

136 kg of dry product were obtained (75.6% yield), but, differently from the product of Example 5, the herein obtained product contained 0.07% of the compound of formula (X), a significant amount in a high purity pharmaceutical product; moreover, the 54% w/w aqueous solution had a slight green colour and showed a significant absorbance increase in 420–450 nm field, with respect to the product obtained in Example 5, while no light absorption was observed between 450 and 650 nm.

Example 7

Final desalting of Gadobutrol (gadolinium complex of [10-[(2,3-dihydroxy-1-(hydroxymethyl)propyl]-1,4,7,10-tetraazacyclododecane-1, 4,7-triacetic acid of formula (XIV))

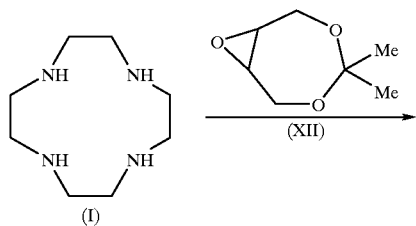

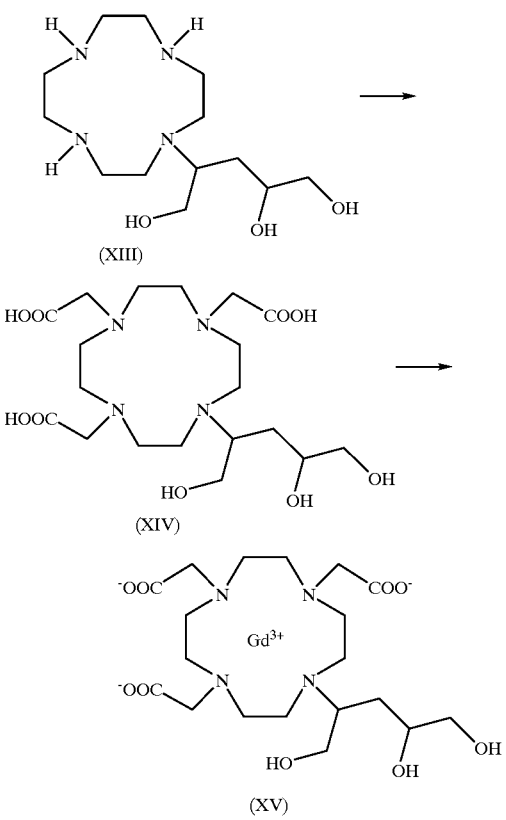

A. Preparation of 10-(1-hydroxymethyl-2,3-dihydroxypropyl)-1, 4,7-triscarboxymethyl-1,4,7,10-tetraazacyclododecane of Formula (XIV)

The ligand of title was prepared according to the procedure disclosed in WO 93/24469, Example 2a, but in a 10-fold scale (2,5 moles).

B. Preparation and Purification of the Gadolinium Complex of the Ligand of Step A (Gadobutrol)

The gadolinium complex, prepared according to the procedure disclosed in WO 93/24469, Example 2b, was deionized in a 4 column-ion exchange unit identical to the one described in Example 1 above, but reduced to a 1/100 scale (1,2 L anion exchange in bicarbonate form, 1 L weakly acidic cation exchanger in $H^+$ form, 0.2 L strongly basic anion exchange in $OH^-$ form and 0.2 L weakly acidic cation exchanger in $H^+$ form), instead of the mixed bed described in WO 93/24469, Example 2b. The desalted product was then crystallised according to the procedure described in WO 93/24469.

1206 g Gadobutrol (1.99 moles, overall yield 79.8% of the theory) were obtained.

The product resulted highly pure: in particular, it did not contain detectable levels of any ionic impurity.

The substitution of the mixed bed with the ion exchange process of the present invention allows a significant increase of the better overall yield (79.8, instead of 72%).

We claim:

1. A process for deionizing a substance unstable at acidic pH, said process comprising contacting, in a series of four ion exchange beds, a solution of the substance to be deionized with a first ion exchange bed of an anion exchanger in hydrogen carbonate form, then, in series, with a second ion exchange bed of a weakly acidic cation exchanger in hydrogen form, then with a third ion exchange bed of a weakly basic anion exchanger in free base form or a strongly basic anion exchanger in hydroxide form, and finally with a fourth ion exchange bed of a weakly acidic cation exchanger in hydrogen form.

2. The process of claim 1 wherein the substance to be deionized is an aqueous solution of a radiographic iodinated contrast media.

3. The process of claim 2 wherein the aqueous solution is a solution of Iomeprol.

4. The process of claim 1 wherein the substance to be deionized is an aqueous solution of Gadoteridol.

5. The process of claim 1 wherein the substance to be deionized is an aqueous solution of Gadobutrol.

6. The process of claim 1 wherein the weakly acidic cation exchanger of the second ion exchange bed contains carboxylic acids as a functional group.

7. The process of claim 6 wherein the substance to be deionized is an aqueous solution of a radiographic iodinated contrast media.

8. The process of claim 7 wherein the aqueous solution is a solution of Iometrol.

9. The process of claim 6 wherein the substance to be deionized is an aqueous solution of Gadoteridol.

10. The process of claim 6 wherein the substance to be deionized is an aqueous solution of Gadobutrol.

* * * * *